J. C. DONNELLY.
CLUTCH MECHANISM.
APPLICATION FILED APR. 1, 1916.
1,293,053.
Patented Feb. 4, 1919.
2 SHEETS—SHEET 1.
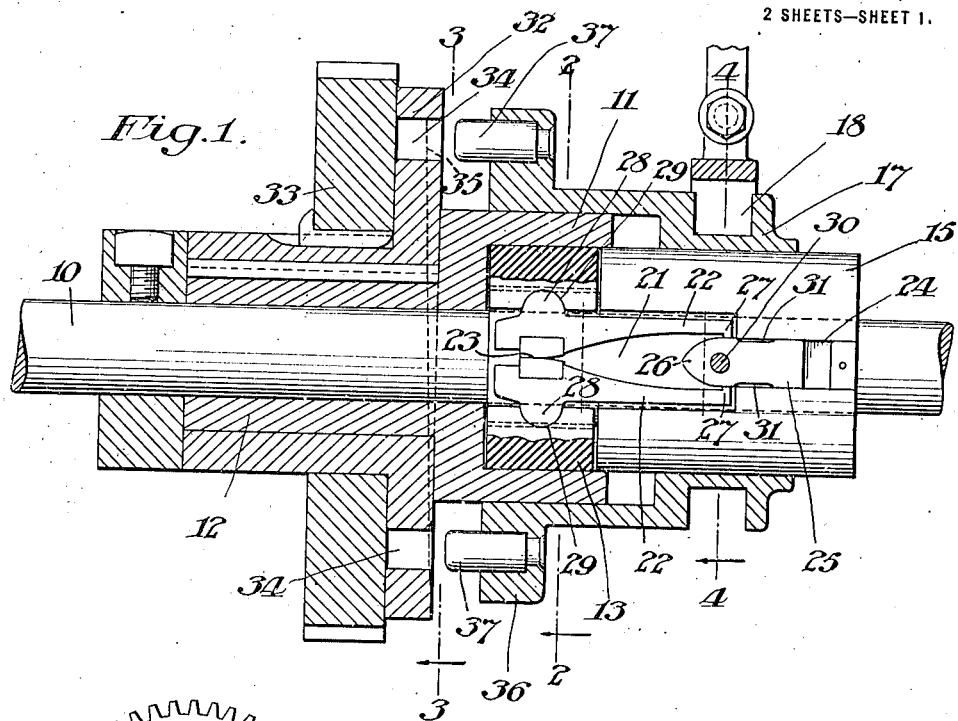
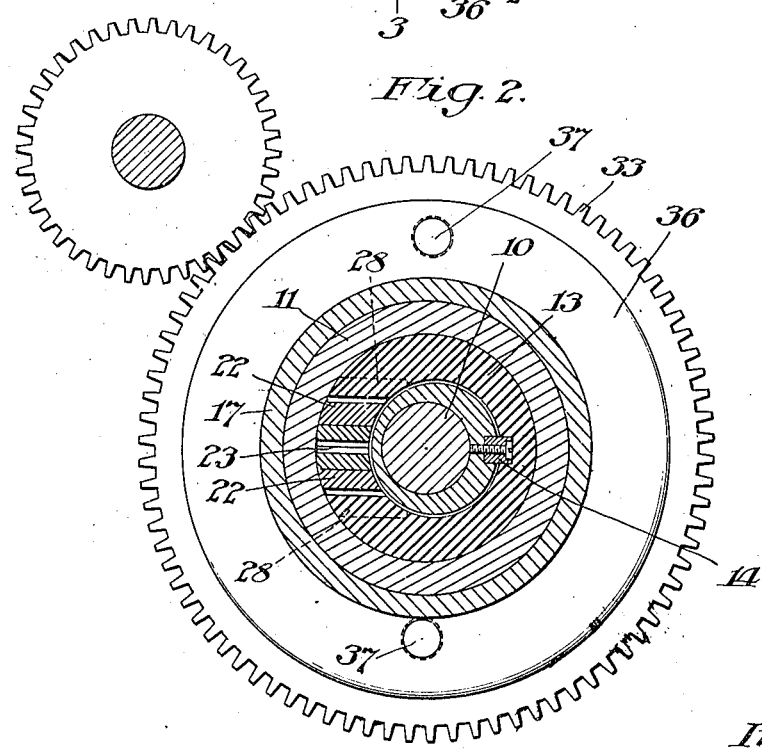
Inventor:
Joseph C. Donnelly,
By John R. Nolan
Attorney.

J. C. DONNELLY.
CLUTCH MECHANISM.
APPLICATION FILED APR. 1, 1916.
1,293,053.
Patented Feb. 4, 1919.
2 SHEETS—SHEET 2.
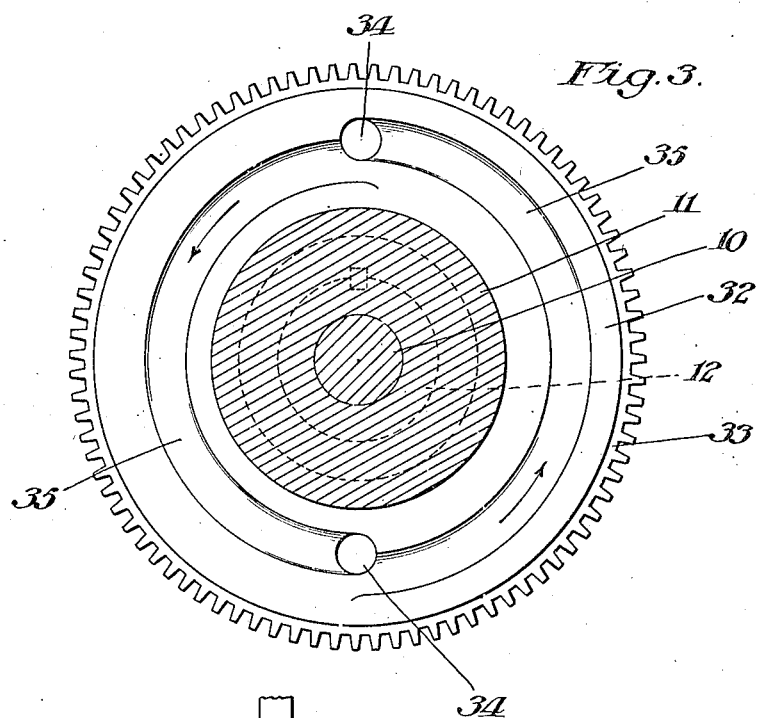
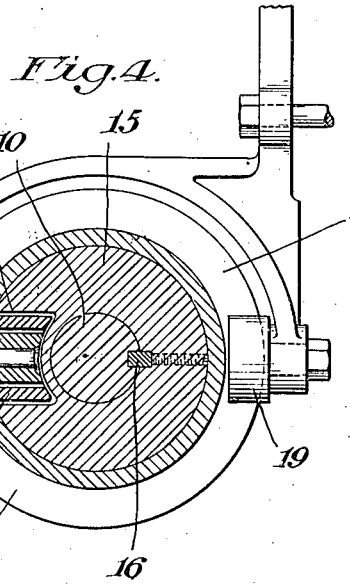
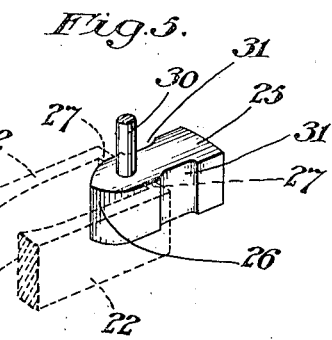
Inventor:
Joseph C. Donnelly,
By John F. Nolan
Attorney.

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

CLUTCH MECHANISM.

1,293,053.  Specification of Letters Patent.  Patented Feb. 4, 1919.

Application filed April 1, 1916. Serial No. 88,207.

*To all whom it may concern:*

Be it known that I, JOSEPH C. DONNELLY, a citizen of the United States, and resident of Barberton, in the county of Summit and State of Ohio, have invented certain new and useful Improvements in Clutch Mechanisms, of which the following is a specification.

This invention relates to clutch mechanism for use more especially in connection with the driving and driven elements of heavy power-operated machinery.

The object of my invention is to provide a clutch mechanism whereby a positively timed interlocking connection of the driving and driven elements can be readily and smoothly effected. To this end the invention, generally stated, comprises a mechanism embodying friction and positive clutch devices and operating means therefor, the whole being so constructed and coördinated that the friction devices are temporarily actuated to effect the initial rotation of the driven from the driving element, and thereafter the positive clutch devices are relatively operated to effect at a given point an interlocking connection between the rotating elements.

The invention also comprises a combined friction and positive clutch mechanism wherein the reëngaging operation of the temporarily released friction devices is effected concurrently with the interlocking operation of the positive devices.

The invention also comprises novel features of construction and combinations of parts which will be hereinafter described and claimed.

In the drawings—

Figure 1 is a longitudinal vertical section, partly in elevation, of a typical form of my improved clutch mechanism, showing the parts as positioned initially to connect the driving elements by the friction clutch devices.

Fig. 2 is a transverse vertical section, as on the line 2—2 of Fig. 1.

Fig. 3 is a similar section, as on the line 3—3 of Fig. 1.

Fig. 4 is a similar section, as on the line 4—4 of Fig. 1.

Fig. 5 is a perspective view of a reciprocative cam member for spreading and releasing the friction clutch levers; part of the latter being indicated by dotted lines.

Referring to the drawings, 10 designates a driving element, which, in the present instance, is represented as a drive shaft. 11 designates a driven element which is illustrated as a socket or female member provided with a hub 12 through which the shaft freely extends. Within this member 11 is contained a split expansible ring 13, which is conveniently secured by means of a key 14 to the reduced end of a male member 15 fast on the shaft 10. In the present instance this male member comprises a bushing which is secured by a key 16 to the shaft, and hence such shaft, the bushing, and the expansible ring rotate as a unitary structure. Preferably the ring 13 is gradually reduced on its inner side as illustrated in Fig. 2, so as to possess greater flexibility. The reduced end of the male member is of the eccentric structure shown, correspondingly with the interior formation of the ring. Slidable on the male member 15 so as to be movable longitudinally of the shaft is a clutch-operating sleeve 17, which is provided as usual with a circumferential groove 18 for the reception of studs or rollers 19 on the limbs of a lever yoke 20 which embraces the sleeve. By manual actuation of the lever the operating sleeve can be shifted longitudinally of the shaft, as desired. One side of the bushing 15 is recessed or slotted throughout its length to provide a space 21 for the reception of a pair of scissors-like levers 22 which are fulcrumed upon each other, as at 23, and to provide also a narrower guide space 24 for the reception of a sliding cam member 25. This member comprises a block having a V-shaped nose 26 which is movable longitudinally of and between the adjacent bearing ends 27 of the levers so as to spread or to release the levers as desired. These levers are provided adjacent their fulcra with knuckle-like portions 28 which are seated in sockets 29 in the respective ends of the expansible ring, whereby when the levers are spread apart by the forcible movement of the cam member therebetween, the ring is expanded in a manner to grip the opposing inner surface of the socket member 11. The cam member is connected with the clutch operating sleeve by means, for example, of a pin or rivet 30, whereby when said sleeve is manually shifted, as above mentioned, the cam member is moved therewith. This cam member is provided in rear of its V-shaped nose with recessed portions 31 which are so disposed that when the cam is partially advanced by actuation of the operating sleeve the lever ends enter the recesses and are thus relieved from the spreading action of the cam, thereby permitting the expanded ring to resume its normal position and thus release the socket member. When the cam member is farther advanced and the recesses moved beyond the lever ends the opposing rearward surfaces of the cam member spread the levers and thus expand the ring 13 to clamp the socket member.

Keyed on or otherwise secured to the hub of the socket member is a positive clutch member, comprising in the present instance an apertured disk 32, on which is mounted a power transmitting element, such, for example, as a gear wheel 33. In the present instance two diametrically-opposite transverse apertures 34 are formed in the disk, one of which is spaced slightly farther from the center of the disk than the other. The outer face of the disk has formed therein two substantially semi-circular cam ways 35 comprising concentric channels the bottoms of which gradually incline inwardly from the face of the disk to the respective perforations, as indicated in Figs. 1 and 3.

That end of the clutch operating sleeve 17 adjacent the apertured disk 32 is provided with a positive clutch member, comprising, in the present instance, a circumferential flange 36 from which project two diametrically-opposite pins 37 which correspond in form, size and relative position with the apertures in the disk; whereby when and only when the pins are in horizontal alinement with the respective apertures of the disk said pins may be entered into the apertures by proper movement of the operating sleeve, thus positively locking together the disk and the sleeve when they are in a given relation to each other. In that case, since this sleeve is connected to the shaft 10 through the cam block and the bushing, the disk and its adjuncts will be effectually connected with the shaft so as to be positively rotated thereby.

When the rotating operating sleeve is moved toward the opposing face of the apertured disk, the pins 37 of the sleeve enter the respective channels 35 and are thereby guided to accurate position for entry into the respective apertures of the disk; and when, on the other hand, the sleeve is fully retracted, the positive clutch members are disengaged, and the position of the nose of the cam in respect to the levers is such that it exerts no outward pressure thereon. Hence in the latter case the expansible ring occupies its normal position and the driven element 11 is idle; although, of course, the operating sleeve, the bushing, the cam, the levers and the expansible ring, by virtue of their connections together and with the shaft, are being positively rotated as a unit.

The operation is briefly as follows: Assume the operating sleeve to be fully retracted and both clutch devices to be in idle position. If now the sleeve be shifted toward the driven element, the beveled nose of the cam member in its initial movement will impinge against and spread the opposing ends of the levers, thereby expanding the frictional ring and operatively connecting the driving and driven elements. Such elements will thus be concurrently rotated. In the continued longitudinal movement of the operating sleeve, the recessed portions 31 of the cam, passing between the proximate ends of the levers, relieve them from pressure and thus permit the automatic retraction of the frictional ring from the opposing surface of the socket member. At this juncture the pins 37 carried by the rotating sleeve enter the opposing channels 35 of the disk 32. In the continued rotation of the socket member and its adjuncts relative to the sleeve, the pins are automatically guided by the channels into alinement with the complementary apertures of the disk, and are then fully entered thereinto. When the pins aline with the apertures the body of the cam in rear of the recesses passes between and spreads the lever arms; thereby expanding the clutch ring 13 against the inner surface of the socket member. This done the driving and driven elements are locked together by the frictional and positive clutch devices.

By virtue of the described positions of the apertures, the cam ways and the pins relative to each other and to the axis of rotation of the driving and driven elements, the automatic timing of the relatively moving parts of the mechanism to which the clutch devices are attached is positively insured; that is to say, one part of the mechanism can be thrown out of operation while the other continues to run, and the latter may thereafter, while running at full speed or load, be positively connected with the former part of the mechanism at a given relative position of the parts so as to effect a proper timing of the two parts of the mechanism. For instance, if such parts include two parallel chains, the links of which match and travel at the same speed in close relation to each other, one of the chains is rendered idle when the clutch is thrown out, but when the clutch is thrown in the frictional elements thereof pick up the load and the complementary positive elements are then alined and interlocked at a definite time which insures the right relation of the chains to each other and their concurrent travel.

Inasmuch as the frictional connection initially rotates the apertured disk 32 of the driven element independently of, and in the same direction as, the driving element, and as the pins 37 on the clutch operating sleeve of the latter are guided to and enter the apertures of the disk during the relative rotation of the opposing parts, it is obvious that the timely interengagement of the complementary pins and apertures is effected with ease and celerity; thus avoiding the shocks and jars heretofore incident to the interlocking of moving and static clutch elements particularly when they are employed in heavy power-operated machinery.

It is to be understood that my invention is not limited to the specific details of construction herein shown and described, as the same may be modified without departing from the spirit of the invention.

I claim—

1. The combination with driving and driven elements, of clutch members therefor having respectively a female part and a male part, a friction device arranged between the two parts and turning with one of them, one of said clutch members having a plurality of apertures therein at different radial distances from the axis of rotation of said elements, and the other clutch member having pins complementary to said apertures for registry therewith when the driving and driven elements bear a single defined relation to each other, and operating means including connections whereby the said friction device and clutch members are successively actuated at predetermined intervals in relation to each other.

2. The combination with driving and driven elements, one of which comprises a female part and the other a male part with an expansible ring arranged between the two parts and turning with one of them, of levers arranged to expand the ring, a cam movable between the levers, said cam having beveled lever-spreading portions and recessed lever-releasing portions adjacent thereto, complementary positive clutch members for the driving and driven elements, one of said members having apertures therein at different distances from the axis of the member and the other member having pins complementary to said apertures for registry therewith, and operating means including connections whereby in the movement of said means to interlock the pins and apertures of the clutch members the cam is actuated to spread and then to release the levers.

3. The combination with driving and driven elements, one of which comprises a female part and the other a male part with an expansible ring arranged between the two parts and turning with one of them, of levers arranged to expand the ring, a cam movable between the levers, said cam having beveled lever-spreading portions and recessed lever-releasing portions adjacent thereto, an operating member connected with said cam, a positive clutch member on said operating member, and a complementary clutch member therefor on the driven element, one of said members having apertures therein at different distances from the axis of the element and inwardly inclined surfaces in the path of rotation of the pins to the respective apertures, whereby in the movement of said operating member to interlock the pins and apertures of the positive clutch members the pins contact with said surfaces and said cam is actuated alternately to spread and to release the said levers.

4. The combination with driving and driven elements, one of which comprises a female part and the other a male part with an expansible ring arranged between the two parts and turning with one of them, of levers arranged to expand the ring, a cam movable between the levers, said cam having beveled lever-spreading portions and recessed lever-releasing portions adjacent thereto, an operating member connected with said cam, a positive clutch member on said operating member, and a complementary clutch member therefor on the driven element, one of said clutch members having apertures therein at different distances from the axis of the said elements and concentric cam ways leading to the respective apertures, and the other clutch member having pins complementary to said apertures for registry therewith.

Signed at Barberton in the county of Summit and State of Ohio this 30 day of Mch A. D. 1916.

JOSEPH C. DONNELLY.